US012339937B1

(12) United States Patent
Wang et al.

(10) Patent No.: US 12,339,937 B1
(45) Date of Patent: Jun. 24, 2025

(54) NEURAL NETWORK-BASED SECURITY DEFENSE METHOD FOR ENCRYPTED MULTIMEDIA DATA, ELECTRONIC DEVICE, AND COMPUTER PROGRAM PRODUCT

(71) Applicant: HANGZHOU HIKVISION DIGITAL TECHNOLOGY CO., LTD., Hangzhou (CN)

(72) Inventors: Bin Wang, Hangzhou (CN); Dechang Zhu, Hangzhou (CN); Weikang Rao, Hangzhou (CN); Chaohao Li, Hangzhou (CN); Si Chen, Hangzhou (CN); Kezhang Lin, Hangzhou (CN)

(73) Assignee: HANGZHOU HIKVISION DIGITAL TECHNOLOGY CO., LTD., Hangzhou (CN)

( * ) Notice: Subject to any disclaimer, the term of this patent is extended or adjusted under 35 U.S.C. 154(b) by 0 days.

(21) Appl. No.: 19/082,761

(22) Filed: Mar. 18, 2025

(30) Foreign Application Priority Data

May 31, 2024 (CN) .......................... 202410705110.1

(51) Int. Cl.
G06F 21/16 (2013.01)
G06N 3/0464 (2023.01)
(Continued)

(52) U.S. Cl.
CPC .......... G06F 21/16 (2013.01); G06N 3/0464 (2023.01); G06N 3/08 (2013.01); H04N 19/124 (2014.11);
(Continued)

(58) Field of Classification Search
CPC .... G06F 21/16; H04N 19/124; H04N 19/625; H04N 19/467
See application file for complete search history.

(56) References Cited

U.S. PATENT DOCUMENTS 7,461,406 B2 * 12/2008 Pelly ................ G11B 20/00536
713/172
9,177,293 B1 * 11/2015 Gagnon ................ H04L 51/212
(Continued)

FOREIGN PATENT DOCUMENTS

CN        1945597 A    4/2007
CN      113035213 A    6/2021
(Continued)

OTHER PUBLICATIONS

Notice of Allowance in Chinese Appln. No. 202410705110.1, mailed on Jul. 9, 2024, 9 pages (with English translation).

Primary Examiner — Viral S Lakhia
(74) Attorney, Agent, or Firm — Fish & Richardson P.C.

(57) ABSTRACT

The present disclosure provides a neural network-based security defense method for encrypted multimedia data, including: adding implicit digital watermark information to original encrypted multimedia traffic to obtain watermark encrypted multimedia traffic; determining a first feature sequence of the watermark encrypted multimedia traffic; based on the first feature sequence and a second feature sequence of the original encrypted multimedia traffic, determining a correlation coefficient between the first feature sequence and the second feature sequence; and if the correlation coefficient indicates that a negative correlation between the first feature sequence and the second feature sequence satisfies a preset condition, performing training based on the first feature sequence and the second feature sequence to obtain a target neural network, where the target neural network is configured to identify whether there is implicit digital watermark information in encrypted multimedia traffic to be detected.

7 Claims, 4 Drawing Sheets

(51) Int. Cl.
  *G06N 3/08*    (2023.01)
  *H04N 19/124*  (2014.01)
  *H04N 19/467*  (2014.01)
  *H04N 19/625*  (2014.01)

(52) U.S. Cl.
  CPC ......... *H04N 19/467* (2014.11); *H04N 19/625* (2014.11)

(56) References Cited

U.S. PATENT DOCUMENTS

| | | | |
|---|---|---|---|
| 10,860,424 B1* | 12/2020 | Dhuse | G06F 11/1076 |
| 10,911,230 B2* | 2/2021 | Gladwin | G06F 3/0673 |
| 10,977,194 B2* | 4/2021 | Grube | H04L 9/0894 |
| 11,068,163 B1* | 7/2021 | Leggette | H04L 67/306 |
| 11,868,498 B1* | 1/2024 | Resch | G06F 21/602 |
| 12,222,822 B2* | 2/2025 | Resch | G06F 3/0617 |
| 12,277,030 B2* | 4/2025 | Dhuse | G06F 11/1076 |
| 2007/0011458 A1* | 1/2007 | Moskowitz | G06T 1/0028 |
| | | | 713/176 |
| 2018/0060612 A1* | 3/2018 | Gladwin | G06F 21/85 |
| 2020/0380145 A1* | 12/2020 | Van Oldenborgh | G06F 18/22 |
| 2025/0005115 A1* | 1/2025 | Mellor | H04L 9/3213 |

FOREIGN PATENT DOCUMENTS

| | | |
|---|---|---|
| CN | 113395583 A | 9/2021 |
| CN | 117615075 A | 2/2024 |
| WO | WO 2023041212 A1 | 3/2023 |

\* cited by examiner

NEURAL NETWORK-BASED SECURITY DEFENSE METHOD FOR ENCRYPTED MULTIMEDIA DATA, ELECTRONIC DEVICE, AND COMPUTER PROGRAM PRODUCT

CROSS REFERENCE TO RELATED APPLICATIONS

This application claims priority to Chinese Patent Application No. 202410705110.1 entitled "NEURAL NETWORK-BASED SECURITY DEFENSE METHOD AND APPARATUS FOR ENCRYPTED MULTIMEDIA DATA" filed on May 31, 2024, the entire content of which is incorporated herein by reference.

TECHNICAL FIELD

The present disclosure relates to the field of network security technology, and in particular to a neural network-based security defense method and apparatus for encrypted multimedia data

BACKGROUND

With the development and popularization of Internet technology, video has become a core function of various applications. In a transmission process of video traffic, various attack means such as tampering and illegal use may be encountered, which brings great risks to the security of video traffic. In order to improve the security of video traffic, an effective means is to add a watermark to the video traffic. The watermark, as a digital rights management technology, can be used to identify and recognize video content. When the video content is tampered with or illegally used, watermark information can provide clues.

Encrypting video traffic refers to encrypting video traffic through encryption technology, which can protect the privacy and integrity of the video traffic during transmission. During the transmission of encrypted video traffic, a watermark can also be added to the encrypted video traffic to detect a leakage of video content.

When adding the watermark to the encrypted video traffic, it is impossible to directly analyze the content because the encrypted video traffic has been encrypted, so it is impossible to effectively identify whether the encrypted video traffic is added with the watermark.

SUMMARY

In view of this, the present disclosure provides a neural network-based security defense method and apparatus for encrypted multimedia data, which can effectively identify whether encrypted multimedia traffic is added with implicit digital watermark information.

The present disclosure provides a neural network-based security defense method for encrypted multimedia data, including:
 adding implicit digital watermark information to original encrypted multimedia traffic to obtain watermark encrypted multimedia traffic;
 determining a first feature sequence of the watermark encrypted multimedia traffic, where the watermark encrypted multimedia traffic is divided into a plurality of segmented traffic according to a specified time interval, and the first feature sequence includes a first feature vector of each of the plurality of segmented traffic; and based on the first feature sequence and a second feature sequence of the original encrypted multimedia traffic, determining a correlation coefficient between the first feature sequence and the second feature sequence, where the original encrypted multimedia traffic is divided into a plurality of segmented traffic according to the specified time interval, and the second feature sequence includes a second feature vector of each of the plurality of segmented traffic; and
 if the correlation coefficient indicates that a negative correlation between the first feature sequence and the second feature sequence satisfies a preset condition, performing training based on the first feature sequence and the second feature sequence to obtain a target neural network, where the target neural network is configured to identify whether there is implicit digital watermark information in encrypted multimedia traffic to be detected.

The present disclosure provides a neural network-based security defense apparatus for encrypted multimedia data, including:
 a processing module, configured to obtain original encrypted multimedia traffic and add implicit digital watermark information to the original encrypted multimedia traffic to obtain watermark encrypted multimedia traffic;
 a determining module, configured to determine a first feature sequence of the watermark encrypted multimedia traffic, where the watermark encrypted multimedia traffic is divided into a plurality of segmented traffic according to a specified time interval, and the first feature sequence includes a first feature vector of each of the plurality of segmented traffic; and based on the first feature sequence and a second feature sequence of the original encrypted multimedia traffic, determine a correlation coefficient between the first feature sequence and the second feature sequence, where the original encrypted multimedia traffic is divided into a plurality of segmented traffic according to the specified time interval, and the second feature sequence includes a second feature vector of each of the plurality of segmented traffic; and
 a training module, configured to perform training based on the first feature sequence and the second feature sequence to obtain a target neural network if the correlation coefficient indicates that a negative correlation between the first feature sequence and the second feature sequence satisfies a preset condition, where the target neural network is configured to identify whether there is implicit digital watermark information in encrypted multimedia traffic to be detected or not.

The present disclosure provides an electronic device, including one or more processors and a machine readable storage medium, where the machine readable storage medium stores machine executable instructions executable by the one or more processors, and the one or more processors are configured to execute the machine executable instructions to implement the above neural network-based security defense method for encrypted multimedia data.

The present disclosure provides a machine readable storage medium that stores machine executable instructions that can be executed by a processor, where the processor is configured to execute the machine executable instructions to implement the above neural network-based security defense method for encrypted multimedia data.

The present disclosure provides a computer program product including a computer program that, when executed by a processor, implements the above neural network-based security defense method for encrypted multimedia data.

From the above technical solution, it can be seen that in the embodiment of the present disclosure, the implicit digital watermark information embedded in the encrypted multimedia traffic can be identified, and whether the encrypted multimedia traffic is added with the implicit digital watermark information can be effectively identified, so that a source and authorization status of the encrypted multimedia traffic can be effectively determined through the implicit digital watermark information. In this way, unauthorized encrypted multimedia traffic can be intercepted, or the propagation and use of encrypted multimedia traffic can be detected, and the encrypted multimedia traffic can be managed pertinently to protect the security of sensitive information. By encrypting multimedia traffic, the implicit digital watermark information embedded in the multimedia traffic is encrypted, and the security and non-tamperability of the implicit digital watermark information can be ensured. Some watermark encrypted multimedia traffic can be selected from a large number of watermark encrypted multimedia traffic based on the correlation coefficient, and these watermark encrypted multimedia traffic have a strong negative correlation with the original encrypted multimedia traffic. After the training is performed based on these watermark encrypted multimedia traffic to obtain the target neural network, the target neural network has high accuracy and reliability. The target neural network can accurately identify whether the encrypted multimedia traffic is added with implicit digital watermark information.

DETAILED DESCRIPTION OF THE EMBODIMENTS

Figure 1:
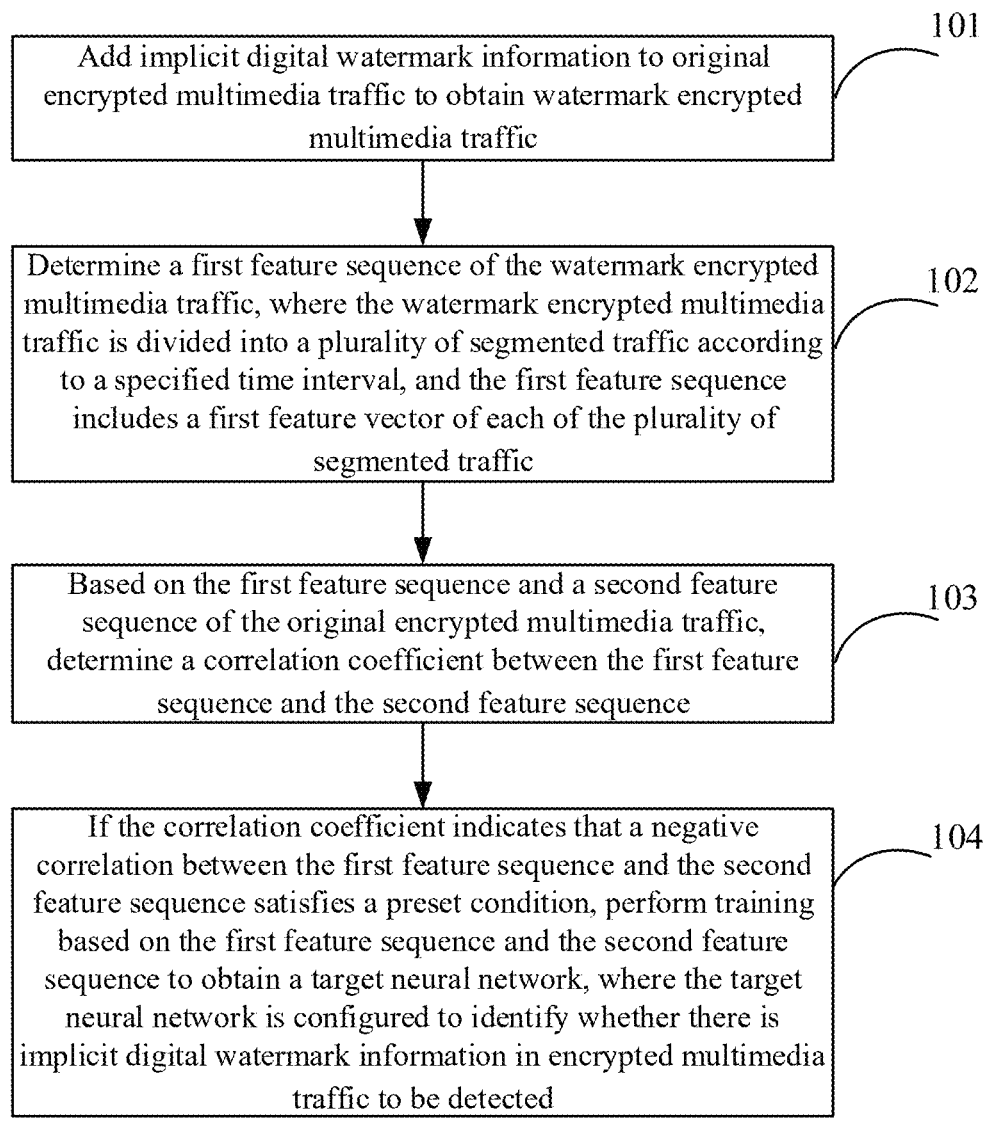
FIG. 1 is a flowchart of a neural network-based security defense method for encrypted multimedia data according to an example of the present disclosure.

An embodiment of the present disclosure proposes a neural network-based security defense method for encrypted multimedia data. The encrypted multimedia data can be encrypted multimedia traffic, and the security defense method is a security defense method for the encrypted multimedia traffic. As shown in FIG. 1, which is a flowchart of the method, the method can include steps 101 to 104.

In step 101, implicit digital watermark information is added to original encrypted multimedia traffic to obtain watermark encrypted multimedia traffic. That is, encrypted multimedia traffic added with implicit digital watermark information added is referred to as the watermark encrypted multimedia traffic.

In step 102, a first feature sequence of the watermark encrypted multimedia traffic is determined. The watermark encrypted multimedia traffic is divided into a plurality of segmented traffic according to a specified time interval, and the first feature sequence can include a first feature vector of each segmented traffic of the plurality of segmented traffic. And, the first feature vector is related to implicit digital watermark information in the segmented traffic.

In step 103, based on the first feature sequence and a second feature sequence of the original encrypted multimedia traffic, a correlation coefficient between the first feature sequence and the second feature sequence is determined. The original encrypted multimedia traffic is divided into a plurality of segmented traffic according to the specified time interval, and the second feature sequence can include a second feature vector of each segmented traffic of the plurality of segmented traffic.

In step 104, if the correlation coefficient indicates that a negative correlation between the first feature sequence and the second feature sequence satisfies a preset condition, training is performed based on the first feature sequence and the second feature sequence to obtain a target neural network, where the target neural network is configured to identify whether there is implicit digital watermark information in encrypted multimedia traffic to be detected.

In an example, the implicit digital watermark information is added to the original encrypted multimedia traffic to obtain the watermark encrypted multimedia traffic, which can include but is not limited to, the implicit digital watermark information is randomly selected from a plurality pieces of implicit digital watermark information in an implicit watermark information base, where the implicit watermark information base is configured to store a plurality pieces of implicit digital watermark information of different watermark types. The selected implicit digital watermark information can be quantified to obtain quantized implicit digital watermark information. The quantized implicit digital watermark information can be encoded to obtain encoded implicit digital watermark information. The encoded implicit digital watermark information can be embedded into the original encrypted multimedia traffic to obtain the watermark encrypted multimedia traffic corresponding to the original encrypted multimedia traffic.

In an example, the encoded implicit digital watermark information is embedded into the original encrypted multimedia traffic to obtain the watermark encrypted multimedia traffic, which can include but is not limited to, an embedding location for whole multimedia is determined from the original encrypted multimedia traffic, and the encoded implicit digital watermark information is embedded into the original encrypted multimedia traffic based on the embedding location, so as to obtain the watermark encrypted multimedia traffic; or, an embedding location for a plurality of consecutive frames is determined from the original encrypted multimedia traffic, and the encoded implicit digital watermark information is embedded into the original encrypted multimedia traffic based on the embedding location, so as to obtain the watermark encrypted multimedia traffic; or, an embedding location for each frame is determined from the original encrypted multimedia traffic, and the encoded implicit digital watermark information is embedded into the original encrypted multimedia traffic based on the embedding location, so as to obtain the watermark encrypted multimedia traffic.

In an example, for each segmented traffic, the first feature vector of the segmented traffic can include, but is not limited to, at least one of the following: an average data packet size, which represents an average of sizes of all data packets in the segmented traffic; a total traffic volume, which represents a total data volume of all data packets in the segmented traffic; an entropy value, which represents a frequency distribution of discrete cosine transform (DCT) coefficients in each block after the segmented traffic is partitioned; an average of delays between data packets, which represents an average of time intervals between adjacent data packets; or a standard deviation of delays between data packets, which represents a standard deviation of time intervals between adjacent data packets.

In an example, the correlation coefficient between the first feature sequence and the second feature sequence is determined based on the first feature sequence and the second feature sequence of the original encrypted multimedia traffic, which can include but is not limited to, a first average feature and a second average feature are determined, where the first average feature can be an average of all first feature vectors, and the second average feature can be an average of all second feature vectors; and the correlation coefficient is determined based on a difference between each first feature vector and the first average feature and a difference between each second feature vector and the second average feature.

In an example, if an absolute value of a difference between the correlation coefficient and a target value is less than a preset threshold, it indicates that the negative correlation between the first feature sequence and the second feature sequence satisfies the preset condition.

Or, if the absolute value of the difference between the correlation coefficient and the target value is not less than the preset threshold, it can indicate that the negative correlation between the first feature sequence and the second feature sequence does not satisfy the preset condition.

In an example, the correlation coefficient is determined based on the difference between each first feature vector and the first average feature and the difference between each second feature vector and the second average feature, which can include but is not limited to, the correlation coefficient is determined by the following formula:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}};$$

where r may represent the correlation coefficient, $x_i$ may represent the first feature vector of an i-th segmented traffic, i ranges from 1 to n, n may represent a total number of segmented traffic, $\bar{x}$ may represent the first average feature, $y_i$ may represent the second feature vector of an i-th segmented traffic, and $\bar{y}$ may represent the second average feature; where the target value can be −1.

In an example, an initial neural network to be trained can include a convolutional network and a temporal network, and the training is performed based on the first feature sequence and the second feature sequence to obtain the target neural network, which can include but is not limited to, the first feature sequence and the second feature sequence are input into the convolutional network, and a first local feature of the first feature sequence and a second local feature of the second feature sequence are extracted through the convolutional network; the first local feature and the second local feature are input into the temporal network, and a first temporal feature of the first feature sequence and a second temporal feature of the second feature sequence are extracted through the temporal network; a first prediction label corresponding to the first feature sequence is determined based on the first temporal feature, and a second prediction label corresponding to the second feature sequence is determined based on the second temporal feature; a loss value is determined based on the first prediction label, a first true label of the first feature sequence, the second prediction label, and a second true label of the second feature sequence; and network parameters of the initial neural network are adjusted based on the loss value to obtain the target neural network.

From the above technical solution, it can be seen that in the embodiment of the present disclosure, the implicit digital watermark information embedded in the encrypted multimedia traffic can be identified, and whether the encrypted multimedia traffic is added with the implicit digital watermark information can be effectively identified, so that a source and authorization status of the encrypted multimedia traffic can be effectively determined through the implicit digital watermark information. In this way, unauthorized encrypted multimedia traffic can be intercepted, or the propagation and use of encrypted multimedia traffic can be detected, and the encrypted multimedia traffic can be managed pertinently to protect the security of sensitive information. By encrypting multimedia traffic, the implicit digital watermark information embedded in the multimedia traffic is encrypted, and the security and non-tamperability of the implicit digital watermark information can be ensured. Some watermark encrypted multimedia traffic can be selected from a large number of watermark encrypted multimedia traffic based on the correlation coefficient, and these watermark encrypted multimedia traffic have a strong negative correlation with the original encrypted multimedia traffic. After the training is performed based on these watermark encrypted multimedia traffic to obtain the target neural network, the target neural network has high accuracy and reliability. The target neural network can accurately identify whether the encrypted multimedia traffic is added with implicit digital watermark information.

The above technical solution in the embodiment of the present disclosure will be described below in combination with specific application scenarios.

An embodiment of the present disclosure proposes a neural network-based security defense method for encrypted multimedia data. The encrypted multimedia data can be encrypted video traffic, and the security defense method is a security defense method for the encrypted video traffic. The encrypted multimedia data can also be encrypted audio traffic, and the security defense method is a security defense method for encrypted audio traffic.

For the convenience of description, in the subsequent embodiments, the encrypted video traffic is taken as an example, the processing manner of encrypted audio traffic is the same as that of encrypted video traffic, and will not be repeated in the present disclosure.

In the neural network-based security defense method for encrypted multimedia data, a training process of a target neural network and a detection process based on the target neural network can be involved, which will be explained below.

Figure 2:
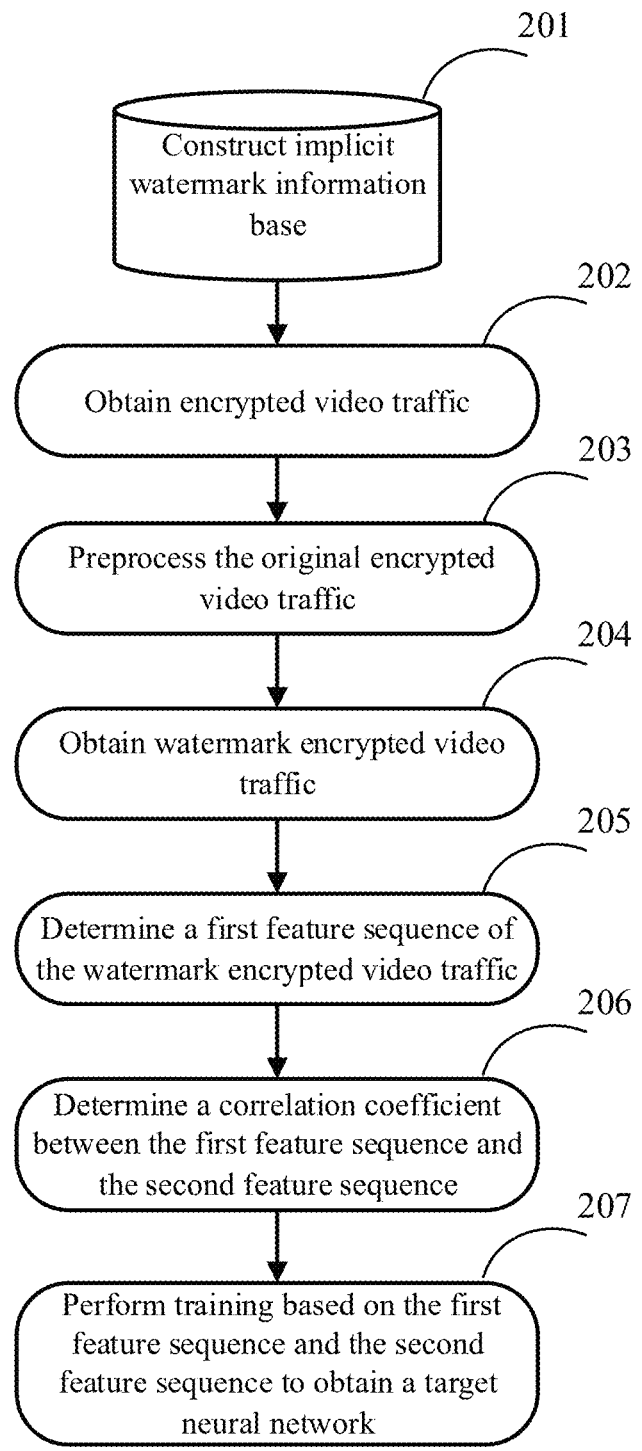
FIG. 2 is a schematic diagram of a training process of a target neural network according to an example of the present disclosure.

FIG. 2 is a schematic diagram of a training process of a target neural network according to an example of the present disclosure. As shown in FIG. 2, the training process can include steps 201 to 207.

In step 201, an implicit watermark information base is constructed. The implicit watermark information base is configured to store a plurality pieces of implicit digital watermark information, and the plurality pieces of implicit digital watermark information include implicit digital watermark information of different watermark types.

In an example, the implicit digital watermark information (also referred to as implicit watermark information) is a type of information hidden in video traffic (for example, digital media), used to identify a source, an owner, or a user of the video traffic, protect a copyright and integrity of the video traffic, and detect a leakage behavior of the video traffic. The implicit digital watermark information can be encoded simultaneously with pixel values of the video traffic or a waveform of video signals, so that the implicit digital watermark information cannot be directly perceived by the user, and can only be extracted and detected in a specific processing process.

In an example, an implicit watermark information base can be constructed in advance, which is used to store implicit digital watermark information of different watermark types, for example, implicit digital watermark information of user identification type (i.e., a watermark for user identification), implicit digital watermark information of copyright information type (file owner) (i.e., a watermark for copyright information), implicit digital watermark information of digital signature type (i.e., a watermark for digital signature), and implicit digital watermark information of timestamp type (i.e., a watermark for timestamp).

The above are just a few examples of watermark types, and there is no limitation on the watermark types in the present disclosure.

In an example, for the implicit digital watermark information in the implicit watermark information base, the implicit digital watermark information can be generated by simulation and stored in the implicit watermark information base, and/or the video traffic can be parsed to obtain the implicit digital watermark information, and the implicit digital watermark information is stored in the implicit watermark information base. There is no limitation on a source of the implicit digital watermark information in the present disclosure.

In step 202, encrypted video traffic is obtained and recorded as original encrypted video traffic.

In an example, encrypted traffic refers to traffic that encrypts and transmits data through encryption technology. The encrypted traffic can include various types of data, for example, video data, audio data, text data, etc. The video data is taken as an example, the encrypted traffic is encrypted video traffic, and the audio data and the text data are processed in similar ways.

Encrypting video traffic refers to encrypting video traffic through encryption technology, which can protect the privacy and integrity of the video traffic during transmission. For example, the encrypted video traffic can be video traffic that needs to be transmitted in a network, which can be understood as an encoded bitstream.

In an example, a public data set is a platform or server for providing the encrypted video traffic, and the encrypted video traffic can be obtained from the public data set. Or, a video content provider can be cooperated with, and the encrypted video traffic is provided by video content provider. Or, the encrypted video traffic can be collected directly from a network. Or, the encrypted video traffic can be generated by a device itself. The above are just a few examples of a source of the encrypted video traffic, and there is no limitation on the source of the encrypted video traffic in this embodiment.

The encrypted video traffic is obtained by encrypting video traffic (also referred to as network traffic) with an encryption protocol. The encryption protocol can be a secure socket layer (SSL) encryption protocol, a transport layer security (TLS) encryption protocol, etc, which is not limited.

In an example, in order to ensure a diversity of the encrypted video traffic, multiple original encrypted video traffic with different video contents can be obtained, multiple original encrypted video traffic with different encryption protocols can be obtained, and/or multiple original encrypted video traffic with different encryption algorithms can be obtained.

In step 203, the original encrypted video traffic is preprocessed.

In an example, after obtaining the original encrypted video traffic, there are often some abnormal data and/or noisy data in the original encrypted video traffic, which may affect the accuracy of subsequent analysis. Based on this, the abnormal data and the noisy data can be found and cleaned.

The abnormal data can include format errors, abnormal values, missing values, etc. The noisy data can include data with an unstable video stream and poor video quality due to network environment, device performance, and other factors.

Various data preprocessing techniques can be adopted during data cleaning, for example, data smoothing, noise filtering, interpolation, etc., can be adopted to clean the abnormal and/or the noisy data. There is no limitation on the cleaning manner in the present disclosure.

In step 204, watermark encrypted video traffic, that is, encrypted video traffic with implicit digital watermark information is obtained.

In an example, for each original encrypted video traffic, implicit digital watermark information is added to the original encrypted video traffic to obtain watermark encrypted video traffic corresponding to the original encrypted video traffic. For example, an original encrypted video traffic is taken as an example, the following steps can be taken to obtain the watermark encrypted video traffic.

In step S11, implicit digital watermark information is randomly selected from the plurality pieces of implicit digital watermark information in the implicit watermark information base, and one or more pieces of implicit digital watermark information can be randomly selected.

For example, the implicit watermark information base includes a plurality pieces of implicit digital watermark information of different watermark types. One piece of implicit digital watermark information can be randomly selected, or a plurality pieces of implicit digital watermark information can be randomly selected.

In step S12, the selected implicit digital watermark information is quantized to obtain quantized implicit digital watermark information, which can be a binary sequence.

In an example, quantization refers to a process of approximating continuous values (or a large number of possible discrete values) of a signal into a finite number of (or few) discrete values. Quantization is mainly applied in a conversion from a continuous signal to a digital signal. The continuous signal is sampled to become the discrete signal and the discrete signal is quantized to become a digital signal.

In an example, after the implicit digital watermark information is selected, the implicit digital watermark information can be quantized to obtain the quantized implicit digital watermark information. There is no limitation on the quantization process in the present disclosure.

In step S13, after obtaining the quantized implicit digital watermark information, the quantized implicit digital watermark information can be encoded to obtain encoded implicit digital watermark information.

In an example, encoding is a process of converting information from one form to another, or a process of converting information from one format to another. The quantized implicit digital watermark information can be encoded by diffusion coding to obtain the encoded implicit digital watermark information. Or, the quantized implicit digital watermark information can be encoded by error correction coding to obtain the encoded implicit digital watermark information. Or, the quantized implicit digital watermark information can be encoded by using self-synchronizing code encoding method to obtain the encoded implicit digital watermark information. The diffusion coding, error correction coding, and self-synchronizing code encoding method are just a few examples, and there is no limitation on the encoding manner in the present disclosure.

In step S14, the encoded implicit digital watermark information is embedded into a designated location of the original encrypted video traffic to obtain the watermark encrypted video traffic corresponding to the original encrypted video traffic.

In a possible implementation, the designated location may be an embedding location for the entire video, for example, a specific location of the entire video is taken as the embedding location. Based on this, the embedding location for the entire video is determined from the original encrypted video traffic, and the encoded implicit digital watermark information is embedded into the original encrypted video traffic based on this embedding location to obtain the watermark encrypted video traffic corresponding to the original encrypted video traffic.

For example, the designated location can be a head location of the entire video, and the encoded implicit digital watermark information can be embedded into the head location of the entire video in the original encrypted video traffic. Or, the designated location can be a tail location of the entire video, and the encoded implicit digital watermark information can be embedded into the tail location of the entire video in the original encrypted video traffic. These are just examples of the designated location, and there is no limitation on the designated location in the present disclosure.

In this manner, only one piece of implicit digital watermark information needs to be embedded in the original encrypted video traffic, therefore, only one piece of implicit digital watermark information needs to be randomly selected from the implicit watermark information base.

In a possible implementation, the designated location may be an embedding location for a plurality of consecutive frames, for example, a specific location for M consecutive frames is taken as the embedding location. Based on this, the embedding location for the plurality of consecutive frames is determined from the original encrypted video traffic, and the encoded implicit digital watermark information is embedded into the original encrypted video traffic based on the embedding location to obtain the watermark encrypted video traffic corresponding to the original encrypted video traffic.

For example, the designated location can be a head location of M consecutive frames. For example, if M is 5, the designated location is the head location of the first frame, the head location of the sixth frame, the head location of the eleventh frame, and so on. The encoded implicit digital watermark information is embedded into the designated location of the original encrypted video traffic (for example, the head location of the first frame, the head location of the sixth frame, and the head location of the eleventh frame). Or, the designated location can be a tail location of M consecutive frames, for example, the tail location of the fifth frame, the tail location of the tenth frame, the tail location of the fifteenth frame, and so on. The encoded implicit digital watermark information is embedded into the designated location of the original encrypted video traffic (for example, the tail location of the fifth frame, the tail location of the tenth frame, and the tail location of the fifteenth frame). These are just examples of the designated location, and there is no limitation on the designated location in the present disclosure.

In this manner, a plurality pieces of implicit digital watermark information need to be embedded in the original encrypted video traffic. One piece of implicit digital watermark information can be randomly selected from the implicit watermark information base, and all embedding locations have the same implicit digital watermark information. Or, a plurality pieces of implicit digital watermark information can be randomly selected from the implicit watermark information base, and the implicit digital watermark information embedded in different embedding locations can be the same or different.

In a possible implementation, the designated location may be an embedding location for each frame, that is, a specific location of each frame is taken as the embedding location. Based on this, the embedding location for each frame is determined from the original encrypted video traffic, and the encoded implicit digital watermark information is embedded into the original encrypted video traffic based on the embedding location to obtain the watermark encrypted video traffic corresponding to the original encrypted video traffic.

For example, the designated location can be a head location of each frame, and the encoded implicit digital watermark information is embedded into the designated location of the original encrypted video traffic (for example, the head location of the first frame, the head location of the second frame, and the head location of the third frame). Or, the designated location can be a tail location of each frame, and the encoded implicit digital watermark information is embedded into the designated location of the original encrypted video traffic. These are just examples of the designated location, and there is no limitation on the designated location in the present disclosure.

In this manner, a plurality pieces of implicit digital watermark information need to be embedded in the original encrypted video traffic. One piece of implicit digital watermark information can be randomly selected from the implicit watermark information base, and all embedding locations have the same implicit digital watermark information. Or, a plurality pieces of implicit digital watermark information can be randomly selected from the implicit watermark information base, and the implicit digital watermark information embedded in different embedding locations can be the same or different.

In step S15, a true label is added to the watermark encrypted video traffic, for example, a value of the true label is a first value (for example, 1). The true label indicates that there is implicit digital watermark information in the watermark encrypted video traffic. A true label can also be added to the original encrypted video traffic, for example, a value of the true label is a second value (for example, 0). The true label indicates that there is no implicit digital watermark information in the original encrypted video traffic.

In step 205, a first feature sequence of the watermark encrypted video traffic is determined.

In an example, since the implicit digital watermark information does not process the original video data, but the implicit digital watermark information is embedded into the encrypted video traffic (i.e., video bitstream), the first feature sequence of the watermark encrypted video traffic (i.e., a stream feature after adding the watermark) and a second feature sequence of the original encrypted video traffic (i.e., a stream feature before adding the watermark) can be analyzed, and then a correlation between the watermark encrypted video traffic and the original encrypted video traffic can be determined based on the first feature sequence and the second feature sequence.

Since the implicit digital watermark information may be embedded in the time domain, that is, the implicit digital watermark information is embedded into a plurality of locations of the original encrypted video traffic, the first feature sequence can be a temporal feature, and the second feature sequence can be a temporal feature. The temporal feature represents a plurality of feature vectors in different time intervals.

For example, the watermark encrypted video traffic can be divided into a plurality of segmented traffic according to a specified time interval (for example, 30 seconds, 1 minute, 3 minutes, etc.), and a duration of each segmented traffic is the specified time interval. A first feature vector of each segmented traffic is determined, and the first feature sequence can include the first feature vector of each segmented traffic. In addition, the original encrypted video traffic can be divided into a plurality of segmented traffic according to a specified time interval, and a duration of each segmented traffic is the specified time interval. A second feature vector of each segmented traffic is determined, and the second feature sequence can include the second feature vector of each segmented traffic.

Since the original encrypted video traffic and the watermark encrypted video traffic have the same time length, the segmented traffic of the watermark encrypted video traffic corresponds one-to-one with the segmented traffic of the original encrypted video traffic. Assuming that the first feature sequence can include the first feature vector of segmented traffic a1, the first feature vector of segmented traffic a2, . . . , and the first feature vector of segmented traffic a8, the second feature sequence can include the second feature vector of segmented traffic b1, the second feature vector of segmented traffic b2, . . . , and the second feature vector of segmented traffic b8.

In a possible implementation, since the first feature sequence is the stream feature after adding the watermark, the first feature vector in the first feature sequence is related to the implicit digital watermark information in the segmented traffic and can reflect features of the implicit digital watermark information. Since the second feature sequence is the stream feature before adding the watermark, the second feature vector in the second feature sequence cannot reflect the features of the implicit digital watermark information.

Considering the different embedding locations (i.e., embedding frequency bands) and time distributions of the implicit digital watermark information, these situations will have the following impacts: 1. bandwidth consumption: since the implicit digital watermark information needs to occupy a certain number of bytes, embedding the implicit digital watermark information will increase a total amount of data, which may lead to changes in the statistical characteristics of traffic size, for example, an average data packet size; 2. distribution characteristics: the implicit digital watermark information will affect an entropy distribution of data, especially when the implicit digital watermark information is distributed according to a specific rule, it may change an entropy value of data; 3. delay and jitter: the insertion of the implicit digital watermark information may increase a delay between data packets; 4. feature correlation: the manner of adding the implicit digital watermark information has a certain correlation with the data content.

On this basis, for each segmented traffic, when performing statistics on the first feature vector of the segmented traffic, the first feature vector of the segmented traffic may include but is not limited to at least one of the following: an average data packet size, a total traffic volume, an entropy value, an average of delays between data packets, or a standard deviation of delays between data packets.

The average data packet size represents an average of sizes of all data packets in the segmented traffic, that is, an average of sizes of all data packets in a period of time. For example, the size of each data packet in the segmented traffic can be counted, and an average of sizes of all data packets can be taken as the average data packet size.

The total traffic volume represents a total data volume of all data packets in the segmented traffic, that is, a total data volume accumulated in a period of time. For example, the data volume of each data packet in the segmented traffic can be counted, and the total data volume of all data packets (i.e., a sum of all data volumes) can be taken as the total traffic volume.

The entropy value represents a frequency distribution of discrete cosine transform (DCT) coefficients in each block after the segmented traffic is partitioned. For example, the segmented traffic can be divided into blocks, and the frequency distribution of DCT coefficients in each block can be counted to obtain the entropy value.

The average of delays between data packets represents an average of time intervals between adjacent data packets. For example, the time interval between two adjacent data packets (for example, a first data packet and a second data packet, the second data packet and the third data packet, and so on) in the segmented traffic can be counted, and an average of all time intervals can be taken as the average of delays between data packets.

The standard deviation of delays between data packets represents a standard deviation of time intervals between adjacent data packets. The standard deviation can reflect a stability of network transmission. For example, the time interval between two adjacent data packets in the segmented traffic can be counted, and a standard deviation of all time intervals can be taken as the standard deviation of delays between data packets.

The above are just a few examples of the first feature vector, and there is no limitation on the first feature vector in the present disclosure.

For each segmented traffic, the average data packet size, the total traffic volume, the entropy value, the average of delays between data packets, and/or the standard deviation of delays between data packets of the segmented traffic can be calculated, and these parameters can constitute the first feature vector of the segmented traffic. Then, first feature vectors of all segmented traffic can constitute the first feature sequence, which is used for subsequent classification and recognition tasks.

In an example, for each segmented traffic of the original encrypted video traffic, when performing statistics on the second feature vector of the segmented traffic, the second feature vector of the segmented traffic may include but is not limited to at least one of the following: an average data packet size, a total traffic volume, an entropy value, an average of delays between data packets, or a standard deviation of delays between data packets. These parameters can constitute the second feature vector of the segmented traffic, and second feature vectors of all segmented traffic can constitute the second feature sequence, which is used for subsequent classification and recognition tasks.

For example, feature parameters in the second feature vector can be consistent with those in the first feature vector. For example, if the first feature vector includes the average data packet size, the second feature vector includes the average data packet size. If the first feature vector includes the average data packet size and the total traffic volume, the second feature vector includes the average data packet size and the total traffic volume, and so on.

In a possible implementation, after obtaining the first feature sequence (the second feature sequence), the feature parameters (for example, the average data packet size) in the first feature vector (the second feature vector) can be pre-processed by a MN (min-max normalization) method. The MN method is a linear transformation of data so that a result is within an interval of [0, 1], making the data smoother and easier to process.

In step 206, a correlation coefficient between the first feature sequence and the second feature sequence is determined based on the first feature sequence of the watermark encrypted video traffic and the second feature sequence of the original encrypted video traffic.

For example, in order to improve the accuracy and reliability of a neural network, a correlation degree between the first feature sequence and the second feature sequence can be evaluated by the correlation coefficient. The correlation degree also represents a correlation degree between the implicit digital watermark information and features of the encrypted traffic. Based on the correlation degree, it is decided whether to use the first feature sequence and the second feature sequence for model training, so that samples with significant features (the first feature sequence and the second feature sequence) are selected as training data of the neural network to improve the accuracy of the neural network.

In a possible implementation, a first average feature and a second average feature can be determined. The first average feature can be an average of all first feature vectors in the first feature sequence. The second average feature can be an average of all second feature vectors in the second feature sequence. On this basis, the correlation coefficient between the first feature sequence and the second feature sequence is determined based on a difference between each first feature vector and the first average feature, and a difference between each second feature vector and the second average feature. For example, the correlation coefficient can be determined by the following formula. The following formula is only an example, and there is no limitation on the formula for determining the correlation coefficient in the present disclosure.

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}}$$

In the above formula, r can represent the correlation coefficient. $x_i$ can represent the first feature vector of an i-th segmented traffic, that is, the feature vector of the segmented traffic with watermark. $\bar{x}$ can represent the first average feature, that is, an average of feature vectors of all segmented traffic with watermark. $y_i$ can represent the second feature vector of an i-th segmented traffic, that is, the feature vector of the segmented traffic without watermark. $\bar{y}$ can represent the second average feature, that is, an average of feature vectors of all segmented traffic without watermark. A value range of i is 1 to n, where n represents a total number of segmented traffic, and the total number of segmented traffic with watermark is the same as the total number of segmented traffic without watermark.

For example, if the correlation coefficient r is close to 1, it indicates that there is a strong positive correlation between the implicit digital watermark information and the features of the encrypted traffic (i.e., there is a strong positive correlation between the first feature sequence with watermark and the second feature sequence without watermark). As the change of the implicit digital watermark information, the video encrypted traffic also changes accordingly, and an impact of the implicit digital watermark information on the features of the video encrypted traffic is relatively small.

If the correlation coefficient r is close to −1, it indicates that there is a strong negative correlation between the implicit digital watermark information and the features of the encrypted traffic (i.e., there is a strong negative correlation between the first feature sequence with watermark and the second feature sequence without watermark). As the change of the implicit digital watermark information, the video encrypted traffic will change in an opposite direction, and the impact of the implicit digital watermark information on the features of the video encrypted traffic is relatively great.

If the correlation coefficient r is close to 0, it indicates that there is no linear correlation between the implicit digital watermark information and the features of the encrypted traffic (i.e., there is no linear correlation between the first feature sequence with watermark and the second feature sequence without watermark). As the change of the implicit digital watermark information, it will not cause changes in the video encrypted traffic, and the impact of the implicit digital watermark information on the features of the video encrypted traffic is relatively small.

From the above, it can be seen that if an absolute value of a difference between the correlation coefficient r and a target value (for example, −1) is less than a preset threshold (which can be configured based on experience), that is, if the correlation coefficient r is close to −1, it can indicate that the negative correlation between the first feature sequence and the second feature sequence is strong (the negative correlation between the first feature sequence and the second feature sequence satisfies a preset condition), and the implicit digital watermark information has a significant impact on the features of the video encrypted traffic. In this case, the first feature sequence and the second feature sequence participate in model training.

If the absolute value of the difference between the correlation coefficient r and the target value (for example, −1) is not less than the preset threshold, for example, if the correlation coefficient r is close to 1 or the correlation coefficient r is close to 0, it can indicate that the negative correlation between the first feature sequence and the second feature sequence is weak (the negative correlation between the first feature sequence and the second feature sequence does not satisfy the preset condition), that is, the negative correlation is not strong, and the implicit digital watermark information has a small impact on the features of the video encrypted traffic. In this case, the first feature sequence and the second feature sequence do not participate in model training.

In step 207, if the correlation coefficient indicates that the negative correlation between the first feature sequence and the second feature sequence satisfies the preset condition, training is performed based on the first feature sequence and the second feature sequence to obtain a target neural network.

In an example, a large number of feature combinations can be obtained, and the feature combinations include the first feature sequence and the second feature sequence. If the negative correlation between the first feature sequence and the second feature sequence satisfies the preset condition (for example, the correlation coefficient r is close to −1), the feature combination is regarded as a first type of feature combination, which participates in the training process of the target neural network. If the negative correlation between the first feature sequence and the second feature sequence does not satisfy the preset condition, the feature combination is regarded as a second type of feature combination, which does not participate in the training process of the target neural network.

After obtaining a large number of the first type of feature combinations, the target neural network can be trained based on these first type of feature combinations. For the convenience of description, one first type of feature combination will be used as an example to illustrate.

In a possible implementation, an initial neural network to be trained may include but is not limited to a convolutional network and a temporal network, i.e., a combination of the temporal network and the convolutional networks is adopted. The temporal network is used to capture temporal features. The convolutional network is used to capture local features. Through the cross complementation of the two networks, the recognition accuracy and robustness of the implicit digital watermark information can be improved. For example, the convolutional network may include but is not limited to a convolutional neural network (CNN). The temporal network may include but is not limited to a long-short term memory (LSTM).

Figure 3:
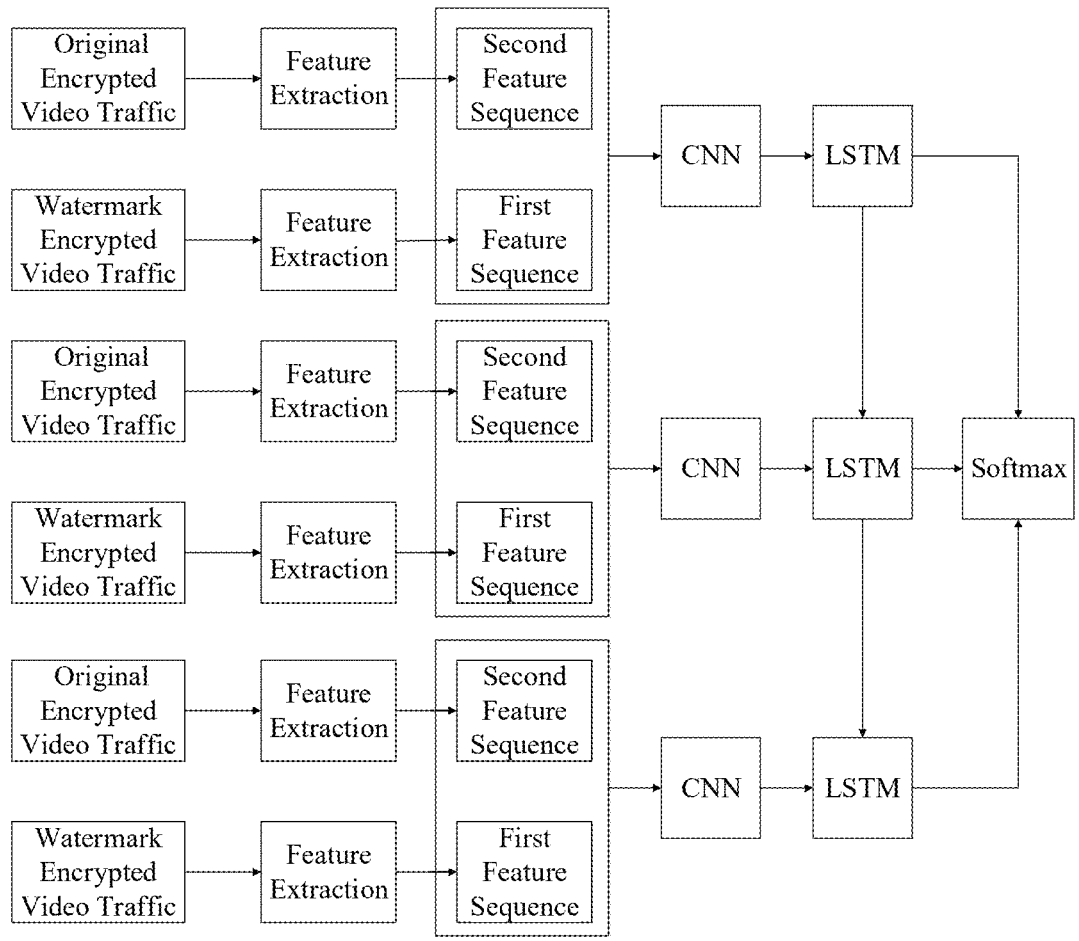
FIG. 3 is a schematic structural diagram of an initial neural network (a target neural network) according to an example of the present disclosure.

For example, as shown in FIG. 3, it is a schematic structural diagram of an initial neural network (a target neural network) according to an example of the present disclosure. The initial neural network can include a convolutional network (taking the CNN as an example), a temporal network (taking the LSTM as an example), and a softmax network layer. This is only an example, and the structure of the initial neural network is not limited.

After extracting the first feature sequence from the watermark encrypted video traffic and the second feature sequence from the original encrypted video traffic, the first feature sequence and the second feature sequence can be input to the convolutional network. A first local feature of the first feature sequence and a second local feature of the second feature sequence can be extracted through the convolution network. In the convolutional network, the convolutional network is used to perform feature extraction on the first feature sequence and the second feature sequence, capture and analyze local features in temporal changes, that is, the first local feature and the second local feature are obtained, and input the first local feature and the second local feature to the temporal network.

The first local feature and the second local feature can be input into the temporal network, and a first temporal feature of the first feature sequence and a second temporal feature of the second feature sequence are extracted through the temporal network. In the temporal network, the temporal network can analyze time series (for example, local features currently input, local features previously inputs, etc.) and learn temporal dependence and long-term dependence from these time series. Due to a memory capability of the temporal network, the temporal network can capture previous information and store it in an internal state, which can capture the temporal dependence and long-term dependence in a video stream, thereby helping the temporal network understand dynamic behaviors and temporal relationships in the video stream. To sum up, the temporal network can process the first local feature and the second local feature based on stored long-term information to obtain the first temporal feature and the second temporal feature.

After obtaining the first temporal feature of the first feature sequence, the first temporal feature is input to the softmax network layer. The softmax network layer determines a first prediction label corresponding to the first feature sequence based on the first temporal feature and outputs the first prediction label corresponding to the first feature sequence. The first prediction label can be a first value or a second value. The first value (for example, 1) indicates that the first feature sequence corresponds to implicit digital watermark information, that is, the watermark encrypted video traffic includes the implicit digital watermark information. The second value (for example, 0) indicates that the first feature sequence does not correspond to implicit digital watermark information, that is, the watermark encrypted video traffic does not include the implicit digital watermark information.

After obtaining the second temporal feature of the second feature sequence, the second temporal feature is input to the softmax network layer. The softmax network layer determines a second prediction label corresponding to the second feature sequence based on the second temporal feature and outputs the second prediction label corresponding to the second feature sequence. The second prediction label can be a first value or a second value. The first value (for example, 1) indicates that the second feature sequence corresponds to implicit digital watermark information, that is, the original encrypted video traffic includes the implicit digital watermark information. The second value (for example, 0) indicates that the second feature sequence does not correspond to implicit digital watermark information, that is, the original encrypted video traffic does not include the implicit digital watermark information.

When inputting the first feature sequence and the second feature sequence into the convolutional network, a first true label of the first feature sequence and a second true label of the second feature sequence can also be synchronously input into the convolutional network. The first true label can be the first value, indicating that the first feature sequence corresponds to implicit digital watermark information. The second true label can be the second value, indicating that the second feature sequence does not correspond to implicit digital watermark information.

On this basis, the first true label and the first prediction label of the first feature sequence, and the second true label and the second prediction label of the second feature sequence can be obtained. Then, a loss value can be determined based on the first prediction label and the first true label, as well as the second prediction label and the second true label. For example, the loss value is determined based on a difference between the first prediction label and the first true label, and a difference between the second prediction label and the second true label, and there is no limitation on the manner of determining the loss value in the present disclosure. After obtaining the loss value, network parameters of the initial neural network can be adjusted based on this loss value, with a goal of making the loss value smaller and smaller. For example, the network parameters of the initial neural network are adjusted by using a gradient descent method.

After adjusting the network parameters of the initial neural network, an adjusted neural network can be obtained. If the adjusted neural network does not converge, the adjusted neural network will be used as the initial neural network, and the above steps will be repeated until the adjusted neural network converges. If the adjusted neural network converges, the adjusted neural network will be used as the target neural network, the training process is completed, and the target neural network is obtained.

In a possible implementation, the true labels (such as the first true label and the second true label) and the prediction labels (such as the first prediction label and the second prediction label) can be the first value (such as 1) and the second value (such as 0), thus indicating whether they correspond to implicit digital watermark information, that is, the neural network implements binary classification.

Or, the true labels and the prediction labels can also represent watermark types, that is, multi-classification can be realized through the neural network. For example, when the true labels and the prediction labels are set to the first value (such as 0), it indicates that there is no implicit digital watermark information. When the true labels and the prediction labels are set to the second value (such as 1), it indicates the implicit digital watermark information corresponding to watermark type A. When the true labels and the prediction labels are set to the third value (such as 2), it indicates the implicit digital watermark information corresponding to watermark type B, and so on. On this basis, after training the target neural network, the target neural network can output the watermark type of the implicit digital watermark information.

At this point, the training process of the target neural network is completed. A detection process can be implemented based on the target neural network. In the detection process based on the target neural network, the following steps can be adopted: after obtaining an encrypted video traffic to be detected, a feature sequence corresponding to the encrypted video traffic to be detected can be determined, and the feature sequence corresponding to the encrypted video traffic to be detected can be input to the target neural network. Whether there is implicit digital watermark information in the encrypted video traffic to be detected can be identified through the target neural network.

For example, it is possible to intercept encrypted video traffic transmitted in a network, which may or may not have implicit digital watermark information.

Then, a third feature sequence corresponding to the encrypted video traffic to be detected is determined. The determination manner can refer to the determination manner of the first feature sequence or the second feature sequence, which will not be repeated here.

Then, the third feature sequence is input to the target neural network (the convolutional network and the temporal network). The third feature sequence is processed by the target neural network to obtain a prediction label corresponding to the third feature sequence.

Based on the prediction label, if the prediction label is the first value (such as 1), it is determined that there is implicit digital watermark information in the encrypted video traffic to be detected. If the prediction label is the second value (such as 0), it is determined that there is no implicit digital watermark information in the encrypted video traffic to be detected. Or, based on the prediction label, if the prediction label is the first value (such as 0), it is determined that there is no implicit digital watermark information in the encrypted video traffic to be detected. If the prediction label is the second value (such as 1), it is determined that there is implicit digital watermark information in the encrypted video traffic to be detected, and the implicit digital watermark information is of watermark type A. If the prediction label is the third value (such as 2), it is determined that there is implicit digital watermark information in the encrypted video traffic to be detected, and the implicit digital watermark information is of watermark type B, and so on.

To sum up, it is possible to determine whether there is implicit digital watermark information in the encrypted video traffic to be detected. When there the is implicit digital watermark information, the watermark type of the implicit digital watermark information can also be obtained, so as to determine the source of the encrypted video traffic to be detected based on the watermark type, that is, from the watermark type. Based on the above information, technical support can be provided for fields such as traffic interception and video source authentication.

From the above technical solution, it can be seen that in the embodiments of the present disclosure, by encrypting the video traffic, the implicit digital watermark information embedded in the video traffic can be encrypted, and the security and non-tamperability of the implicit digital watermark information are ensured. The implicit digital watermark information embedded in the video bitstream is identified, so as to effectively determine the source and authorization status of the video stream, intercept unauthorized video streams, provide rights protection for copyright owners, and manage video streams in a targeted manner to protect the security of sensitive information. By utilizing artificial intelligence technology to automatically and quickly extract and identify watermark features, the security of video content can still be protected accurately and efficiently in the face of complex network environments and different attack means.

Figure 4:
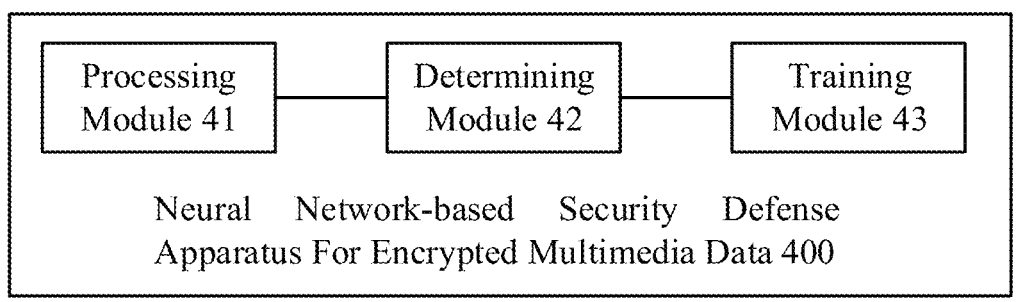
FIG. 4 is a schematic structural diagram of a neural network-based security defense apparatus for encrypted multimedia data according to an example of the present disclosure.

Based on the same application concept as the above method, an embodiment of the present disclosure proposes a neural network-based security defense apparatus for encrypted multimedia data. FIG. 4 is a schematic structural diagram of the apparatus. As shown in FIG. 4, the apparatus 400 includes a processing module 41, a determining module 42, and a training module 43.

The processing module 41 is configured to obtain original encrypted multimedia traffic and add implicit digital watermark information to the original encrypted multimedia traffic to obtain watermark encrypted multimedia traffic.

The determining module 42 is configured to determine a first feature sequence of the watermark encrypted multimedia traffic, where the watermark encrypted multimedia traffic is divided into a plurality of segmented traffic according to a specified time interval, the first feature sequence includes a first feature vector of each of the plurality of segmented traffic, and the first feature vector is related to the implicit digital watermark information in the segmented traffic; and based on the first feature sequence and a second feature sequence of the original encrypted multimedia traffic, determine a correlation coefficient between the first feature sequence and the second feature sequence, where the original encrypted multimedia traffic is divided into a plurality of segmented traffic according to the specified time interval, and the second feature sequence includes a second feature vector of each of the plurality of segmented traffic.

The training module 43 is configured to perform training based on the first feature sequence and the second feature sequence to obtain a target neural network if the correlation coefficient indicates that a negative correlation between the first feature sequence and the second feature sequence satisfies a preset condition, where the target neural network is configured to identify whether there is implicit digital watermark information in encrypted multimedia traffic to be detected or not.

In an example, when adding the implicit digital watermark information to the original encrypted multimedia traffic to obtain the watermark encrypted multimedia traffic, the processing module 41 is specifically configured to: randomly select the implicit digital watermark information from a plurality pieces of implicit digital watermark information in an implicit watermark information base, where the implicit watermark information base is configured to store implicit digital watermark information of different watermark types; quantize the selected implicit digital watermark information to obtain quantized implicit digital watermark information; encode the quantized implicit digital watermark information to obtain encoded implicit digital watermark information; and embed the encoded implicit digital watermark information into the original encrypted multimedia traffic to obtain the watermark encrypted multimedia traffic corresponding to the original encrypted multimedia traffic.

In an example, when embedding the encoded implicit digital watermark information into the original encrypted multimedia traffic, the processing module 41 is specifically configured to: determine an embedding location for whole multimedia from the original encrypted multimedia traffic, and embed the encoded implicit digital watermark information into the original encrypted multimedia traffic based on the embedding location; or determine an embedding location for a plurality of consecutive frames from the original encrypted multimedia traffic, and embed the encoded implicit digital watermark information into the original encrypted multimedia traffic based on the embedding location; or determine an embedding location for each frame from the original encrypted multimedia traffic, and embed the encoded implicit digital watermark information into the original encrypted multimedia traffic based on the embedding location.

In an example, for each of the plurality of segmented traffic, the first feature vector of the segmented traffic includes at least one of: an average data packet size, which represents an average of sizes of all data packets in the segmented traffic; a total traffic volume, which represents a total data volume of all data packets in the segmented traffic; an entropy value, which represents a frequency distribution of discrete cosine transform (DCT) coefficients in each block after the segmented traffic is partitioned; an average of delays between data packets, which represents an average of time intervals between adjacent data packets; or a standard deviation of delays between data packets, which represents a standard deviation of time intervals between adjacent data packets.

In an example, when determining the correlation coefficient between the first feature sequence and the second feature sequence based on the first feature sequence and the second feature sequence of the original encrypted multimedia traffic, the determining module 42 is specifically configured to: determine a first average feature and a second average feature, where the first average feature is an average of all first feature vectors, and the second average feature is an average of all second feature vectors; and determine the correlation coefficient based on a difference between each first feature vector and the first average feature and a difference between each second feature vector and the second average feature; where if an absolute value of a difference between the correlation coefficient and a target value is less than a preset threshold, it indicates that the negative correlation between the first feature sequence and the second feature sequence satisfies the preset condition.

In an example, when determining the correlation coefficient based on the difference between each first feature vector and the first average feature and the difference between each second feature vector and the second average feature, the determining module 42 is specifically configured to: determine the correlation coefficient by a following formula:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}};$$

where r represents the correlation coefficient, $x_i$ represents the first feature vector of an i-th segmented traffic, i ranges from 1 to n, n represents a total number of segmented traffic, $\bar{x}$ represents the first average feature, $y_i$ represents the second feature vector of an i-th segmented traffic, and $\bar{y}$ represents the second average feature; where the target value is −1.

In an example, an initial neural network to be trained includes a convolutional network and a temporal network, and when performing the training based on the first feature sequence and the second feature sequence to obtain the target neural network, the training module 43 is specifically configured to: input the first feature sequence and the second feature sequence into the convolutional network, and extract a first local feature of the first feature sequence and a second local feature of the second feature sequence through the convolutional network; input the first local feature and the second local feature into the temporal network, and extract a first temporal feature of the first feature sequence and a second temporal feature of the second feature sequence through the temporal network; determine a first prediction label corresponding to the first feature sequence based on the first temporal feature, and determine a second prediction label corresponding to the second feature sequence based on the second temporal feature; determine a loss value based on the first prediction label, a first true label of the first feature sequence, the second prediction label, and a second true label of the second feature sequence; and adjust network parameters of the initial neural network based on the loss value to obtain the target neural network.

Figure 5:
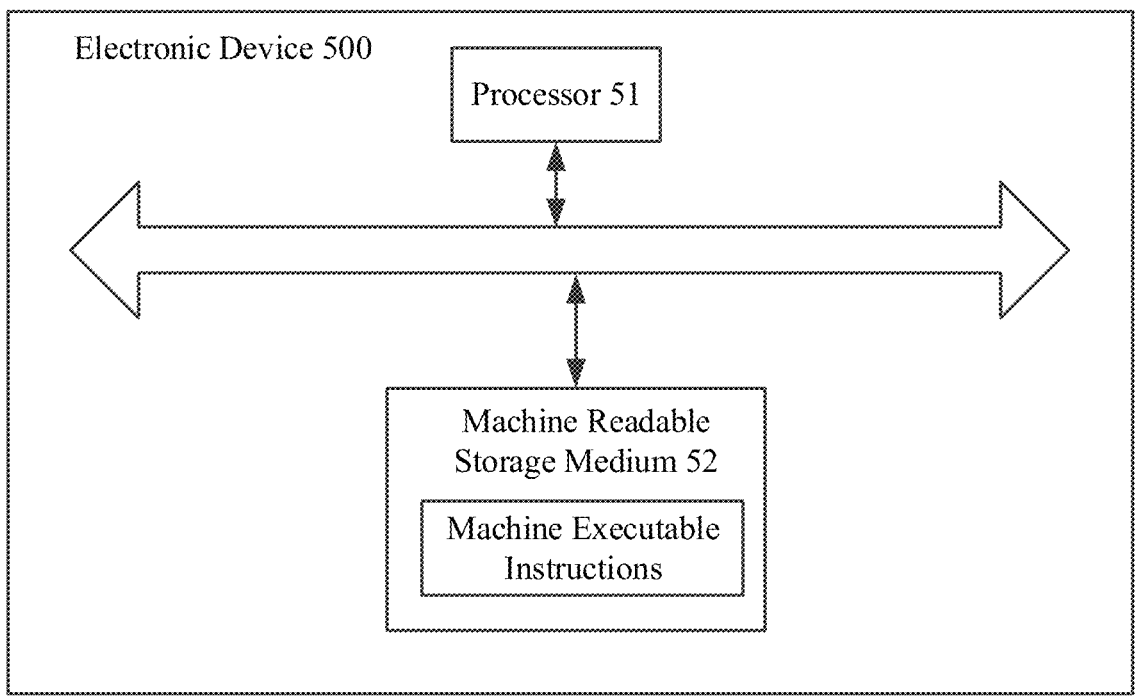
FIG. 5 is a hardware structure diagram of an electronic device according to an example of the present disclosure.

Based on the same application concept as the above method, an embodiment of the present disclosure proposes an electronic device. As shown in FIG. 5, the electronic device 500 includes one or more processors 51 and a machine readable storage medium 52. The machine readable storage medium 52 stores machine executable instructions that can be executed by the one or more processors 51. The one or more processors are configured to execute the machine executable instructions to implement the neural network-based security defense method for encrypted multimedia data in the above examples.

Based on the same application concept as the above method, an embodiment of the present disclosure also proposes a machine readable storage medium, which stores several computer instructions. When the computer instructions are executed by a processor, the neural network-based security defense method for encrypted multimedia data in the above examples can be implemented.

The above machine readable storage medium can be any electronic, magnetic, optical or other physical storage device, which can contain or store information such as executable instructions, data, etc. For example, the machine readable storage medium can be a random access memory (RAM), a volatile memory, a non-volatile memory, a flash memory, a storage drive (such as a hard disk drive), a solid-state drive, any type of storage disk (such as an optical disk, a dvd), or a similar storage medium, or a combination thereof.

Based on the same application concept as the above method, an embodiment of the present disclosure also proposes a computer program product, including a computer program that, when executed by a processor, implements the neural network-based security defense method for encrypted multimedia data in the above examples.

Those skilled in the art should understand that the embodiments of the present disclosure can be provided as methods, systems, or computer program products. Therefore, the present disclosure may take the form of a fully hardware implementation, a fully software implementation, or a combination of software and hardware implementation. Moreover, the embodiments of the present disclosure may take the form of a computer program product implemented on one or more computer usable storage media (including but not limited to disk storage, CD-ROM, optical storage, etc.) containing computer usable program code.

The above are only examples of the present disclosure and are not intended to limit the present disclosure. For those skilled in the art, the present disclosure may have various modifications and variations. Any modifications, equivalent substitutions, improvements, etc. made within the spirit and principles of the present disclosure shall be included within the scope of the claims of the present disclosure.

What is claimed is:

1. A neural network-based security defense method for encrypted multimedia data, comprising:
adding implicit digital watermark information to original encrypted multimedia traffic to obtain watermark encrypted multimedia traffic;
determining a first feature sequence of the watermark encrypted multimedia traffic, wherein the watermark encrypted multimedia traffic is divided into a plurality of segmented traffic according to a specified time interval, and the first feature sequence comprises a first feature vector of each of the plurality of segmented traffic; and based on the first feature sequence and a second feature sequence of the original encrypted multimedia traffic, determining a correlation coefficient between the first feature sequence and the second feature sequence, wherein the original encrypted multimedia traffic is divided into a plurality of segmented traffic according to the specified time interval, and the second feature sequence comprises a second feature vector of each of the plurality of segmented traffic; and
if the correlation coefficient indicates that a negative correlation between the first feature sequence and the second feature sequence satisfies a preset condition, performing training based on the first feature sequence and the second feature sequence to obtain a target neural network, wherein the target neural network is configured to identify whether there is implicit digital watermark information in encrypted multimedia traffic to be detected,
wherein adding the implicit digital watermark information to the original encrypted multimedia traffic to obtain the watermark encrypted multimedia traffic comprises:
randomly selecting the implicit digital watermark information from a plurality pieces of implicit digital watermark information in an implicit watermark information base, wherein the implicit watermark information base is configured to store implicit digital watermark information of different watermark types;
quantizing the selected implicit digital watermark information to obtain quantized implicit digital watermark information;
encoding the quantized implicit digital watermark information to obtain encoded implicit digital watermark information; and
embedding the encoded implicit digital watermark information into the original encrypted multimedia traffic to obtain the watermark encrypted multimedia traffic corresponding to the original encrypted multimedia traffic, and
wherein embedding the encoded implicit digital watermark information into the original encrypted multimedia traffic comprises:
determining an embedding location for whole multimedia from the original encrypted multimedia traffic, and embedding the encoded implicit digital watermark information into the original encrypted multimedia traffic based on the embedding location; or
determining an embedding location for a plurality of consecutive frames from the
original encrypted multimedia traffic, and embedding the encoded implicit digital watermark information into the original encrypted multimedia traffic based on the embedding location; or
determining an embedding location for each frame from the original encrypted
multimedia traffic, and embedding the encoded implicit digital watermark information into the original encrypted multimedia traffic based on the embedding location.

2. The method according to claim 1, wherein for each of the plurality of segmented traffic, the first feature vector of the segmented traffic comprises at least one of:
an average data packet size, which represents an average of sizes of all data packets in the segmented traffic;
a total traffic volume, which represents a total data volume of all data packets in the segmented traffic;
an entropy value, which represents a frequency distribution of discrete cosine transform (DCT) coefficients in each block after the segmented traffic is partitioned;
an average of delays between data packets, which represents an average of time intervals between adjacent data packets; or
a standard deviation of delays between data packets, which represents a standard deviation of time intervals between adjacent data packets.

3. The method according to claim 1, wherein, based on the first feature sequence and the second feature sequence of the original encrypted multimedia traffic, determining the correlation coefficient between the first feature sequence and the second feature sequence, comprises:
determining a first average feature and a second average feature, wherein the first average feature is an average of all first feature vectors, and the second average feature is an average of all second feature vectors; and
determining the correlation coefficient based on a difference between each first feature vector and the first average feature and a difference between each second feature vector and the second average feature;
wherein if an absolute value of a difference between the correlation coefficient and a target value is less than a preset threshold, it indicates that the negative correlation between the first feature sequence and the second feature sequence satisfies the preset condition.

4. The method according to claim 3, wherein determining the correlation coefficient based on the difference between each first feature vector and the first average feature and the difference between each second feature vector and the second average feature comprises:

determining the correlation coefficient by a following formula:

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}};$$

wherein r represents the correlation coefficient, $x_i$ represents the first feature vector of an i-th segmented traffic, i ranges from 1 to n, n represents a total number of segmented traffic, $\bar{x}$ represents the first average feature, $y_i$ represents the second feature vector of an i-th segmented traffic, and $\bar{y}$ represents the second average feature;

wherein the target value is −1.

5. The method according to claim 1, wherein an initial neural network to be trained comprises a convolutional network and a temporal network, and performing the training based on the first feature sequence and the second feature sequence to obtain the target neural network comprises:

inputting the first feature sequence and the second feature sequence into the convolutional network, and extracting a first local feature of the first feature sequence and a second local feature of the second feature sequence through the convolutional network;

inputting the first local feature and the second local feature into the temporal network, and extracting a first temporal feature of the first feature sequence and a second temporal feature of the second feature sequence through the temporal network;

determining a first prediction label corresponding to the first feature sequence based on the first temporal feature, and determining a second prediction label corresponding to the second feature sequence based on the second temporal feature; and determining a loss value based on the first prediction label, a first true label of the first feature sequence, the second prediction label, and a second true label of the second feature sequence; and adjusting network parameters of the initial neural network based on the loss value to obtain the target neural network.

6. An electronic device, comprising one or more hardware processors and a machine readable storage medium, wherein the machine readable storage medium stores machine executable instructions executable by the one or more hardware processors, and the one or more hardware processors are configured to execute the machine executable instructions to perform operations comprising:

adding implicit digital watermark information to original encrypted multimedia traffic to obtain watermark encrypted multimedia traffic;

determining a first feature sequence of the watermark encrypted multimedia traffic, wherein the watermark encrypted multimedia traffic is divided into a plurality of segmented traffic according to a specified time interval, and the first feature sequence comprises a first feature vector of each of the plurality of segmented traffic; and based on the first feature sequence and a second feature sequence of the original encrypted multimedia traffic, determining a correlation coefficient between the first feature sequence and the second feature sequence, wherein the original encrypted multimedia traffic is divided into a plurality of segmented traffic according to the specified time interval, and the second feature sequence comprises a second feature vector of each of the plurality of segmented traffic; and if the correlation coefficient indicates that a negative correlation between the first feature sequence and the second feature sequence satisfies a preset condition, performing training based on the first feature sequence and the second feature sequence to obtain a target neural network, wherein the target neural network is configured to identify whether there is implicit digital watermark information in encrypted multimedia traffic to be detected, wherein adding the implicit digital watermark information to the original encrypted multimedia traffic to obtain the watermark encrypted multimedia traffic comprises:

randomly selecting the implicit digital watermark information from a plurality pieces of implicit digital watermark information in an implicit watermark information base, wherein the implicit watermark information base is configured to store implicit digital watermark information of different watermark types;

quantizing the selected implicit digital watermark information to obtain quantized implicit digital watermark information;
encoding the quantized implicit digital watermark information to obtain encoded implicit digital watermark information; and
embedding the encoded implicit digital watermark information into the original encrypted multimedia traffic to obtain the watermark encrypted multimedia traffic corresponding to the original encrypted multimedia traffic, and wherein embedding the encoded implicit digital watermark information into the original encrypted multimedia traffic comprises:

determining an embedding location for whole multimedia from the original encrypted multimedia traffic, and embedding the encoded implicit digital watermark information into the original encrypted multimedia traffic based on the embedding location; or determining an embedding location for a plurality of consecutive frames from the original encrypted multimedia traffic, and embedding the encoded implicit digital watermark information into the original encrypted multimedia traffic based on the embedding location; or determining an embedding location for each frame from the original encrypted multimedia traffic, and embedding the encoded implicit digital watermark information into the original encrypted multimedia traffic based on the embedding location.

7. A non-transitory computer program product comprising a computer program which, when executed by a processor, performs operations comprising:

adding implicit digital watermark information to original encrypted multimedia traffic to obtain watermark encrypted multimedia traffic;

determining a first feature sequence of the watermark encrypted multimedia traffic, wherein the watermark encrypted multimedia traffic is divided into a plurality of segmented traffic according to a specified time interval, and the first feature sequence comprises a first feature vector of each of the plurality of segmented traffic; and based on the first feature sequence and a second feature sequence of the original encrypted multimedia traffic, determining a correlation coefficient between the first feature sequence and the second feature sequence, wherein the original encrypted multimedia traffic is divided into a plurality of segmented traffic according to the specified time interval, and the second feature sequence comprises a second feature vector of each of the plurality of segmented traffic; and if the correlation coefficient indicates that a negative correlation between the first feature sequence and the second feature sequence satisfies a preset condition, performing training based on the first feature sequence and the second feature sequence to obtain a target neural network, wherein the target neural network is configured to identify whether there is implicit digital watermark information in encrypted multimedia traffic to be detected, wherein adding the implicit digital watermark information to the original encrypted multimedia traffic to obtain the watermark encrypted multimedia traffic comprises:

randomly selecting the implicit digital watermark information from a plurality pieces of implicit digital watermark information in an implicit watermark information base, wherein the implicit watermark information base is configured to store implicit digital watermark information of different watermark types;

quantizing the selected implicit digital watermark information to obtain quantized implicit digital watermark information;

encoding the quantized implicit digital watermark information to obtain encoded implicit digital watermark information; and embedding the encoded implicit digital watermark information into the original encrypted multimedia traffic to obtain the watermark encrypted multimedia traffic corresponding to the original encrypted multimedia traffic, and wherein embedding the encoded implicit digital watermark information into the original encrypted multimedia traffic comprises:

determining an embedding location for whole multimedia from the original encrypted multimedia traffic, and embedding the encoded implicit digital watermark information into the original encrypted multimedia traffic based on the embedding location; or determining an embedding location for a plurality of consecutive frames from the original encrypted multimedia traffic, and embedding the encoded implicit digital watermark information into the original encrypted multimedia traffic based on the embedding location; or determining an embedding location for each frame from the original encrypted multimedia traffic, and embedding the encoded implicit digital watermark information into the original encrypted multimedia traffic based on the embedding location.

\* \* \* \* \*